United States Patent [19]

Nakamura et al.

[11] Patent Number: 4,759,702
[45] Date of Patent: Jul. 26, 1988

[54] STRETCHING DEVICE FOR STRETCHING TUBULAR FILM

[75] Inventors: Shunichi Nakamura, Hikari; Shingo Kaneko, Houfu; Tomoyasu Kawamura, Kudamatsu, all of Japan

[73] Assignee: Tokuyama Soda Kabushiki Kaisha, Japan

[21] Appl. No.: 50,109

[22] Filed: May 15, 1987

[30] Foreign Application Priority Data

May 20, 1986 [JP] Japan .............................. 61-74496[U]

[51] Int. Cl.$^4$ .............................................. B29C 55/28
[52] U.S. Cl. .................................. 425/66; 264/209.5; 264/291; 264/566; 264/567; 425/325; 425/397
[58] Field of Search ............ 425/66, 72 R, 325, 326.1, 425/394, 397, 403, 384, 403.1, 328, 404, DIG. 17, DIG. 53; 264/209.2, 209.5, 563, 566, 567, 291, 292

[56] References Cited

U.S. PATENT DOCUMENTS

| 2,697,248 | 12/1954 | Longstreth et al. | 425/403 X |
| 3,257,489 | 6/1966 | Heffelfinger | 264/566 X |
| 3,296,343 | 1/1967 | Buttolph et al. | 264/566 X |
| 3,313,870 | 4/1967 | Yazawa | 264/209.5 X |
| 3,574,806 | 4/1971 | Potter et al. | 425/325 X |
| 3,608,019 | 9/1971 | Sato et al. | 264/209.5 X |
| 3,678,545 | 7/1972 | Hino et al. | 264/209.5 X |
| 3,904,342 | 9/1975 | Sato et al. | 264/209.5 X |
| 4,165,356 | 8/1979 | Heider | 264/566 X |

FOREIGN PATENT DOCUMENTS 45-19798  7/1970  Japan ................................ 264/209.5
60-26009  2/1985  Japan .

Primary Examiner—Richard L. Chiesa
Attorney, Agent, or Firm—Beveridge, DeGrandi & Weilacher

[57] ABSTRACT

A stretching device for stretching a tubular film includes a mandrel including a stretching section, a pair of payoff nip rolls disposed upstream of the mandrel and a pair of take-up nip rolls disposed downstream of the mandrel. The stretching section of the mandrel is comprised of a plurality of rings arranged substantially concentrically in spaced-apart relationship in the travelling direction of the tubular film. The outside diameter of a ring on the downstream side is larger than that of a ring on the upstream side. Each of the rings has a plurality of rotating members mounted rotatably, and the plurality of rotating members define an outer circumferential ring edge which is generally smoothly circular.

14 Claims, 3 Drawing Sheets

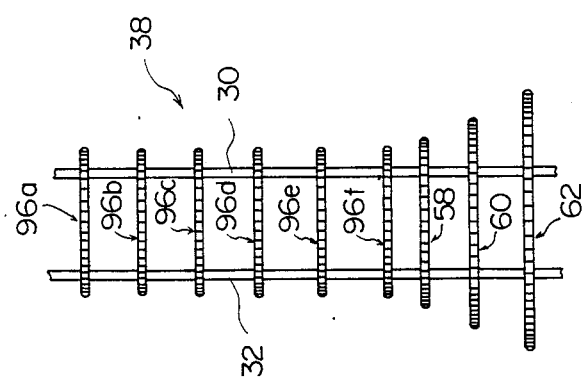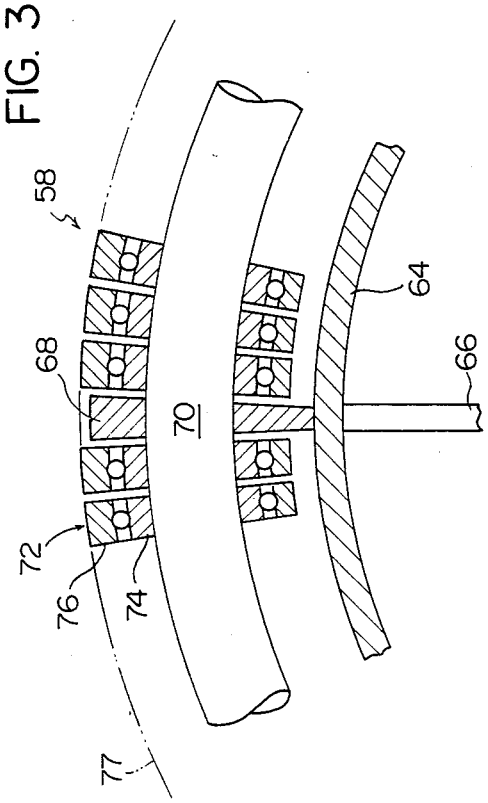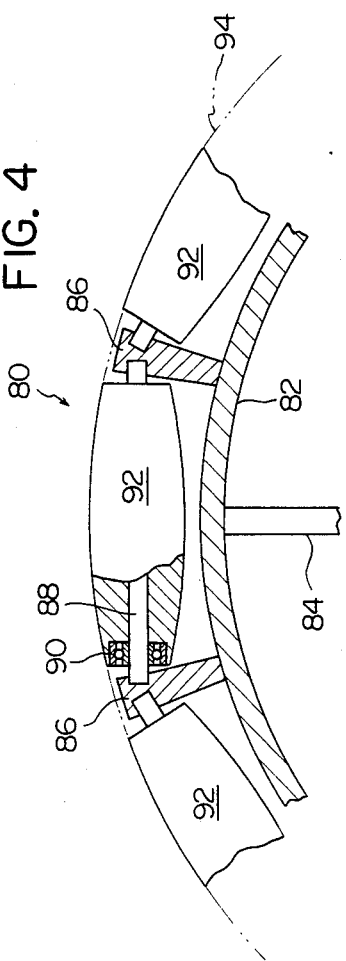

STRETCHING DEVICE FOR STRETCHING TUBULAR FILM

FIELD OF THE INVENTION

1. This invention relates to a stretching device for stretching a tubular film in its transverse direction, namely in its circumferential direction, and more specifically, to a stretching device having a mandrel around and over which a tubular film is caused to travel.

2. Description of the Prior Art

As disclosed, for example, in Japanese Patent Publication No. 26009/1985, a method has previously gained commercial acceptance in which a tubular film formed by extruding a thermoplastic resin through an annular extrusion opening is stretched biaxially (i.e., longitudinally and transversely) to produce a thin tubular film. Biaxial stretching of the tubular film is usually carried out by a two-step stretching method comprising first stretching it in the longitudinal direction, and then transversely or transversely and longitudinally at the same time, or a one-step method comprising directly stretching an unstretched tubular film simultaneously in the transverse and longitudinal directions. In any of these stretching methods, a mandrel-type stretching device is conveniently used to stretch the tubular film transversely, or transversely and longitudinally at the same time.

A typical example of the mandrel-type stretching device comprises a mandrel having a pre-heating section and a stretching section, a pair of payoff nip rolls disposed upstream of the mandrel and a pair of take-up nip rolls disposed downstream of the mandrel. The tubular film to be stretched is delivered from the pair of payoff nip rolls and caused to travel around the mandrel in the axial direction of the mandrel, and then taken up by the pair of take-up nip rolls. The stretching device further includes heating means for heating the tubular film in the pre-heating section and the stretching section of the mandrel, and cooling means for cooling the tubular film downstream of the stretching section of the mandrel. The pre-heating section of the mandrel is defined by a cylindrical wall having substantially the same outside diameter as the diameter of the tubular film before transverse stretching, and the stretching section of the mandrel is defined by a truncated conical wall having an outside diameter progressively increasing downstream in the travelling direction.

The conventional mandrel-type stretching device, however, has a serious problem to be solved, particularly when the tubular film to be stretched has a relatively low strength, for example the film is prepared from a composition comprising a thermoplastic resin such as polyethylene and a relatively large amount (for example, 10 to 85% by weight) of an inorganic filler. The problem is that a longitudinally extending slit frequently forms in the tubular film in the stretching section of the mandrel and transverse rupture forms in the immediate downstream of the mandrel. This problem becomes pronounced as the stretching speed (the travelling speed of the tubular film) and the stretch ratio increase.

Biaxially stretched films made from the composition comprising a thermoplastic resin and a relatively large amount of an inorganic filler have good flexibility, moisture permeability and water-proofness, and because of these unique properties, there has recently been a markedly increased demand for these films as, for example, liner materials for raincoats and diaper covers or as innerlining materials for sportswear. It is desired therefore to produce such biaxially stretched films at high speeds with a high stretching precision and a high thickness precision. But this desire has not been filled owing to the aforesaid problem in the stretching device.

SUMMARY OF THE INVENTION

It is a primary object of this invention therefore to solve the aforesaid problem of the conventional stretching device, and to enable biaxially stretched films to be produced at high speeds with a high stretching precision and a high thickness precision.

Another object of this invention is to provide a novel and excellent stretching device capable of stretching a tubular film transversely, or transversely and longitudinally at the same time, at a high stretching speed and a high stretch ratio with a high stretching precision and a high thickness precision even when the film has a relatively low strength, for example when it is made from a composition comprising a thermoplastic resin and a relatively large amount of an inorganic filler.

The present inventors first extensively studied the aforesaid problem in the conventional stretching device, and consequently found that in the conventional stretching device, the mandrel, particularly its stretching section, exerts a substantial frictional resistance on the travelling tubular film and causes formation of the above-mentioned slit in the tubular film.

Further investigations including experimental work conducted by the present inventors on the basis of the foregoing fact have now led to the discovery that it is important to reduce the frictional resistance of the stretching section of the mandrel on the travelling tubular film drastically or substantially to zero. It has also been found that when the stretching section of the mandrel is allowed to contact the tubular film locally at a plurality of circumferentially spaced sites, the stretch ratio of the tubular film becomes considerably non-uniform in the circumferential direction and the stretched tubular film is rendered wavy in the circumferential direction; and therefore that to reduce the frictional resistance of the stretching section of the mandrel on the travelling tubular film drastically or substantially to zero, it is also important for the stretching section of the mandrel to have a generally smoothly circular peripheral edge.

On the basis of the above knowledge of the present inventors, the present invention provides a stretching device for stretching a tubular film, said device comprising a mandrel including a stretching section, a pair of payoff nip rolls disposed upstream of the mandrel and a pair of take-up nip rolls disposed downstream of the mandrel and adapted to deliver a tubular film from the pair of payoff nip rollers, cause it to travel around and over the mandrel, and take it up by the pair of take-up nip rollers whereby it is stretched transversely of the travelling direction during travelling; said stretching section of the mandrel being comprised of a plurality of rings arranged substantially concentrically in spaced-apart relationship in the travelling direction of the tubular film, the outside diameter of a ring on the downstream side being larger than that of a ring on the upstream side, each of said rings having a plurality of rotating members mounted rotatably, and the plurality of rotating members defining an outer circumferential ring edge which is generally smoothly circular.

Other objects of this invention will become apparent from the following detailed description made with reference to the accompanying drawings.

BRIEF DESCRIPTION OF THE DRAWINGS

FIG. 3 is a partial sectional view showing rings used in the stretching device of FIG. 1;

FIG. 4 is a partial sectional view showing a modified example of the rings; and

FIG. 5 is a simplified front elevation showing a modified example of the mandrel.

DETAILED DESCRIPTION OF PREFERRED EMBODIMENTS

Figure 1:
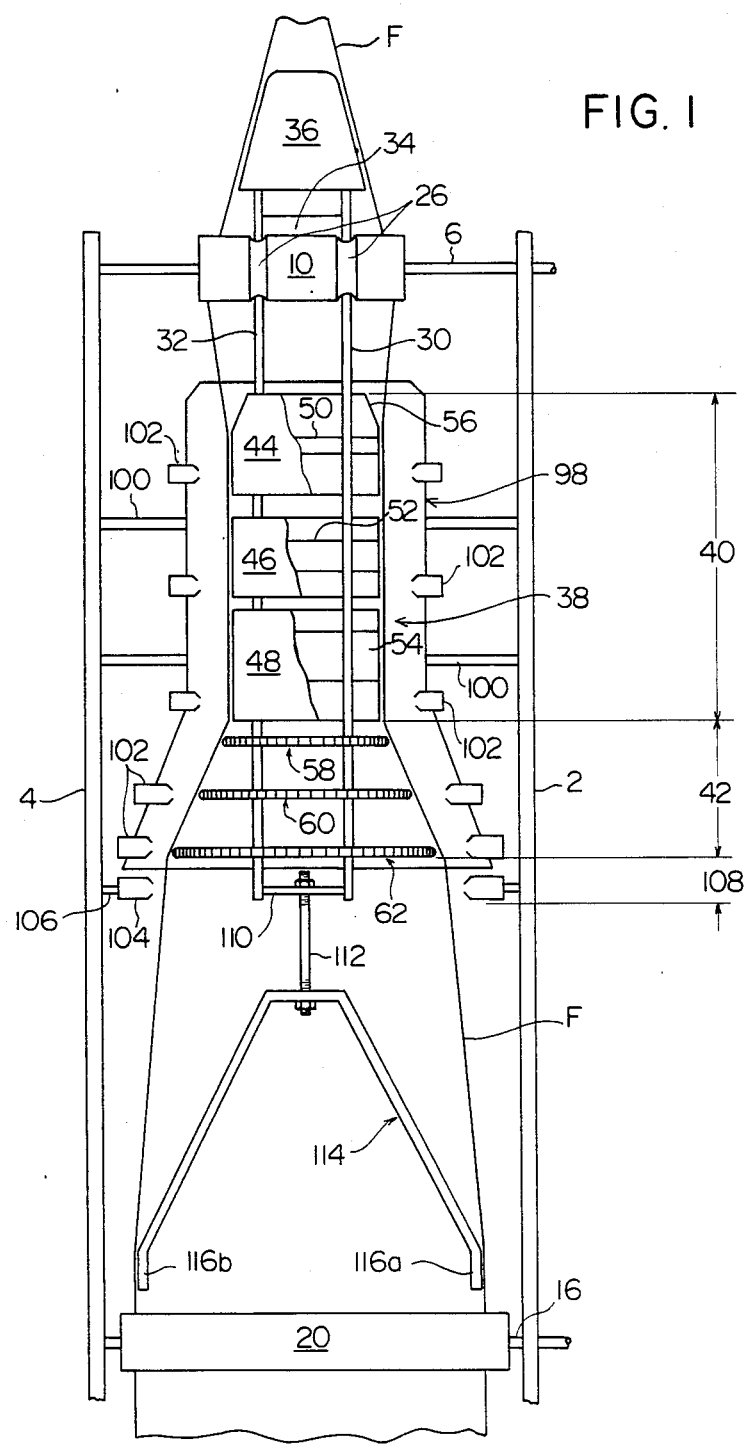
FIG. 1 is a simplified front elevation, partly in section, showing one embodiment of the stretching device constructed in accordance with this invention.
Figure 2:
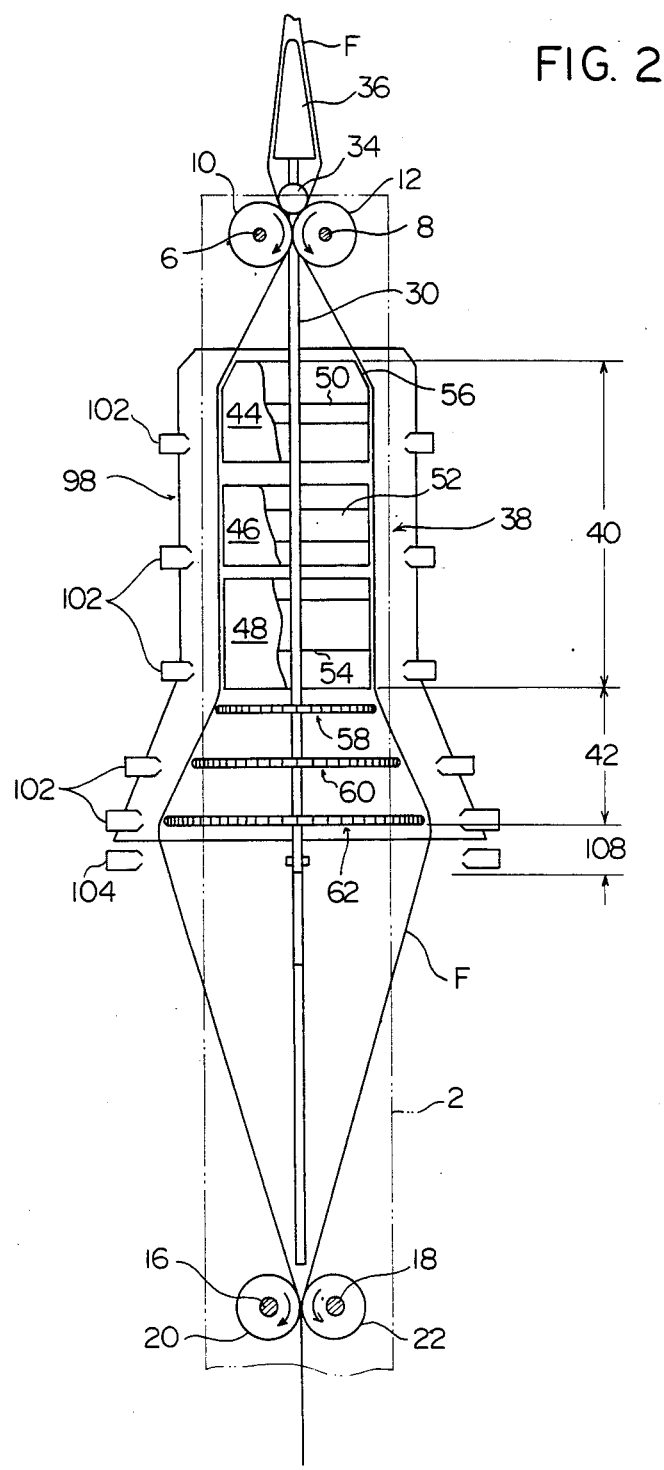
FIG. 2 is a simplified side elevation showing the stretching device of claim 1 partly in section.

FIGS. 1 and 2 show one embodiment of the stretching device constructed in accordance with this invention. The illustrated stretching device includes upstanding supports 2 and 4 spaced from each other a predetermined distance in the left-right direction in FIG. 1 and extending substantially vertically. A pair of shafts 6 and 8 spaced from each other a predetermined distance in the left-right direction in FIG. 2 are rotatably mounted on the upper end portions of the upstanding supports 2 and 4. Rolls 10 and 12 are fixed respectively to the shafts 6 and 8. These rolls 10 and 12 constitute a pair of payoff nip rolls. One end portion of the shaft 6 is drivingly coupled to a driving source (not shown), which may be an electric motor, through a suitable coupling means (not shown). The rolls 10 and 12 are rotated by the driving source at a predetermined speed in the directions shown by arrows in FIG. 2. A pair of shafts 16 and 18 spaced from each other a predetermined distance in the left-right direction in FIG. 2 are rotatably mounted on the bottom parts of the upstanding supports 2 and 4, and rolls 20 and 22 are respectively fixed to the shafts 16 and 18. These rolls 20 and 22 constitute a pair of take-up nip rolls. One end portion of the shaft 16 is drivingly coupled to the above driving source through a suitable coupling means (not shown). By the driving source, the rolls 20 and 22 are rotated at a predetermined speed in the directions shown by arrows in FIG. 2.

A pair of axially spaced annular grooves 26 are formed in each of the rolls 10 and 12, and a pair of suspending rods 30 and 32 extend substantially vertically through these annular grooves 26. A substantially horizontally extending suspending cylinder 34 is fixed to the upper end portions of the suspending rods 30 and 32 which project upwardly beyond the rolls 10 and 12. The cylinder 34 is placed on the rolls 10 and 12, and thus, the cylinder 34 and the suspending rods 30 and 32 are supported by the rolls 10 and 12. A guide block 36 is fixed to the upper ends of the suspending rods 30 and 32.

Below the rolls 10 and 12, a mandrel shown generally at 38 is mounted on the suspending rods 30 and 32. The mandrel 38 includes a pre-heating section 40 and a stretching section 42 located downstream thereof. The pre-heating section 40 is comprised of three cylindrical walls 44, 46 and 48 spaced from one another vertically and arranged substantially concentrically. The cylindrical walls 44, 46 and 48 are connected at their inside surfaces, respectively, to the suspending rods 30 and 32 by connecting members 50, 52 and 54 which may be of a suitable shape. An introduction section 56 of a truncated conical shape having an outside diameter progressively decreasing upwardly is formed integrally in the upper end portion of the cylindrical wall 44 (and therefore in the upstream end portion of the pre-heating section). Conveniently, the outside diameter of each of the cylindrical walls 44, 46 and 48 excepting the introduction section 56 is substantially the same as the diameter of the tubular film to be stretched (this will be described in more detail hereinafter). If desired, the pre-heating section 40 may be constructed of a single cylindrical wall extending continuously from the upstream end to the downstream end of the pre-heating section 40, or of two or at least 4 cylindrical walls, instead of the three cylindrical walls 44, 46 and 48.

In the stretching device constructed in accordance with this invention, it is critical that the stretching section 42 of the mandrel 38 is constructed of a plurality of rings spaced from each other in the travelling direction of the tubular film (in the vertical direction in the illustrated embodiment) and arranged substantially concentrically, the outside diameter of a ring on the downstream side being larger than that of a ring on the upstream side. In the illustrated embodiment, the stretching section 42 is comprised of three rings 58, 60 and 62 spaced from one another vertically and arranged concentrically. The ring 58 has a larger outside diameter than the diameter of the tubular film to be stretched, and the ring 60 has a larger outside diameter than the outside diameter of the ring 58. The outside diameter of the ring 62 is larger than that of the ring 60.

In the stretching device constructed in accordance with this invention, it is also critical that each of the rings 58, 60 and 62 constituting the stretching section 42 of the mandrel 38 has a plurality of rotatably mounted rotating members, and these rotating members define an outer circumferential ring edge which is generally smoothly circular (free from substantial raised and depressed portions). With reference to FIG. 3 in conjunction with FIGS. 1 and 2, the ring 58 has an annular supporting member 64 which is connected to the suspending rods 30 and 32 by a connecting member 66 (only part of which is shown in FIG. 3) which may be of any suitable type. A plurality of circumferentially spaced and radially outwardly projecting supporting arms 68 (only one of which is shown in FIG. 3) are fixed to the supporting member 64. An annular supporting shaft 70 is supported substantially horizontally by the supporting arms 68. The supporting shaft 70 has a circular cross-sectional shape. A number of bearings 72 which may be ordinary commercial radial bearings are mounted on the supporting shaft 70. Conveniently, the bearings 72 are made of steel having a low rate of thermal expansion such as high temperature bearing steel or high carbon chromium bearing steel. Each of the bearings 72 has an inside race 74 and an outside race 76 capable of freely rotating relative to each other, and the inside race 74 is fixed to the supporting shaft 70, and the outside race 76 constitutes a rotating member. The outside race 76 of each of the bearings 72 is rotatable around the central axis of each bearing 72. It will be seen by reference to FIG. 3 that a polygon composed of many straight lines as defined by connecting the central axes of the bearings 72 nearly agrees with the circular central axis of the supporting shaft 70 and exists within a plane substantially perpendicular to the travelling direction of the tubular film (a direction perpendicular to the sheet surface in FIG. 3).

As can be understood by reference to FIG. 3, the outer circumferential edge of the ring 58 (as will be described hereinbelow, the inside surface of the tubular film is brought into contact with this outer circumferential edge) is defined by the cylindrical outer circumferential surfaces of the rotating members consisting of the outside races 76 of the bearings 72. As indicated by the two-dot chain line 77, the outer circumferential edge of the ring 58 is generally smoothly circular although it has some breaks attributed to some spaces among the bearings 72 and the supporting arms 68. Preferably, the projecting end surfaces of the supporting arms 68 disposed in circumferentially spaced relationship are located slightly radially inwardly of the above outer circumferential edge of the ring 58. In order to make the outer circumferential edge of the ring 58 defined by the outer circumferential surfaces of the outside races 76 of the bearings 72 more smoothly circular, the outer circumferential surfaces of the several races 76 can be connected smoothly, if desired, by filling a suitable resin between the adjoining outside races 76. If, however, an excessively large number of the outside races 76 are connected, free rotation of the outside races is necessarily hampered.

The rings 60 and 62 may be of substantially the same structure as the ring 58. A detailed description of the rings 60 and 62 will therefore be omitted to avoid duplication.

FIG. 4 shows a modified example of the rings 58, 60 and 62. A ring 80 shown in FIG. 4 has an annular supporting member 82 which is connected to the suspending rods 30 and 32 (FIGS. 1 and 2) by a connecting member 84 (only part of which is shown in FIG. 4) which may be of a suitable type. A plurality of circumferentially spaced and radially outwardly projecting supporting arms 86 are fixed to the supporting member 82. Substantially horizontally extending shafts 88 are fixed each between adjoining supporting arms 86. A rotating member 92 is rotatably mounted on each of the shafts 88 via a radial bearing 90. The rotating member 92 can freely rotate around the central axis of each shaft 88 which exists within a plane substantially perpendicular to the travelling direction of the tubular film (a direction perpendicular to the sheet surface in FIG. 4). The rotating member 92 has a barrel-shaped or, in other words, a convexly-shaped outer circumferential surface having an outside diameter progressively increasing from both ends towards the center. It will be seen from FIG. 4 that the outer circumferential edge of the ring 80 is defined by the barrel-shaped outer circumferential surfaces of the rotating members 92. As shown by a two-dot chain line 94, the above outer circumferential edge is generally smoothly circular although it has some breaks attributed to some spaces existing among the rotating members 92. Preferably, the projecting end surfaces of the supporting arms among the rotating members 92 are located slightly radially inwardly of the above outer circumferential edge. Each of the rotating members 92 may be made of a suitable material not deformable by heating, preferably a material having a low rate of thermal expansion. Suitable materials for making the rotating members 92 include, for example, metals such as iron, copper, aluminum, titanium, chromium and nickel and alloys of these, especially carbon steel and stainless steel. It is also possible to make the rotating members 92 from thermoplastic resins having a high softening point such as fluorine-containing resins, polyamides, polyimides, polyesters, polysulfones, polyphenylene sulfide and polycarbonates, and thermosetting resins including phenolic resins, epoxy resins and silicones.

FIG. 5 illustrates a modified example of the mandrel 38. In the mandrel 38 shown in FIG. 5, the pre-heating section 40 is comprised of a plurality of (six in the illustrated embodiment) rings 96a to 96f which are substantially concentrically arranged and spaced from each other in the travelling direction of the tubular film (the vertical direction in FIG. 5). Conveniently, the outside diameter of each of the rings 96a to 96f is substantially equal to the diameter of the tubular film to be stretched. The structure of each of the rings 96a to 96f may be substantially the same as that of the ring 58 shown in FIG. 3 or that of the ring 80 shown in FIG. 4. Except the aforesaid structure, the structure of the mandrel 38 shown in FIG. 5 is substantially the same as that of the mandrel 38 shown in FIGS. 1 and 2.

Again with reference to FIGS. 1 and 2, the illustrated stretching device further includes a cover 98 surrounding the pre-heating section 40 and the stretching section 42. The cover 98 has a cylindrical upper half portion surrounding the pre-heating section 40 and a truncated conical lower half portion surrounding the stretching section 42. The cover 98 is connected to the upstanding supports 2 and 4 by connecting members 100 of a suitable type. Annular discharge nozzles 102 of hot air-type heating means of a known form are mounted on the cover 98 in spaced-apart relationship in the vertical direction. The annular discharge nozzles 102 are caused to communicate with a source (not shown) of supplying heated air via suitable communicating means (not shown), and discharge heated air toward the mandrel 38 to heat the pre-heating section 40 and the tubular film travelling over the stretching section 42. If desired, other types of heating means such as a far infrared ray heater may be used in place of the hot air-type heating means. Annular discharge nozzles 104 of cooling means which may be of a known type are disposed immediately downstream of (below) the stretching section 42. The discharge nozzles 104 are connected to the upstanding supports 2 and 4 by connecting members 106 which may be of any suitable type. The annular discharge nozzles 104 are caused to communicate with a source (not shown) of supplying a cooling medium via a suitable communicating means (not shown), and applying a cooling medium which may be water or cold air to the tubular film in a cooling zone 108 positioned immediately downstream of the stretching section 42 of the mandrel 38.

In the illustrated stretching device, a transverse member 110 is fixed to the lower end portions of the suspending rods 30 and 32, and a downwardly extending member 112 is fixed to the central part of the transverse member 110. A guide member 114 is secured to the lower end of the downwardly extending member 112. The guide member 114 has legs 116a and 116b extending inclinedly downwardly on the left and right sides in FIG. 1 and then substantially vertically. The width in the left-right direction in FIG. 1 (i.e., the direction of the central axis of the rolls 20 and 22) defined by the lower portions of the legs 116a and 116b corresponds to half of the circumferential length of the stretched tubular film.

The above stretching device can be applied to the stretching of any tubular film. A typical example of the tubular film is one composed of a thermoplastic resin containing 10 to 85% by weight, especially 40 to 80% by weight, of an inorganic filler. Such a tubular film can be prepared, for example, by mixing the thermoplastic resin and the filler by a suitable mixer such as a Henschel mixer, a super mixer or a ribbon blender, optionally pelletizing the mixture, melting the mixture in an extruder, extruding it through a die having an annular extrusion opening, and then cooling the extrudate. Alternatively, the thermoplastic resin and the filler may be directly fed into the extruder and melt-mixed there.

Typical examples of thermoplastic resins which can be used conveniently include (i) polyolefins such as polyethylene, polypropylene, polybutene, polybutylene and poly-4-methyl-pentene-1, copolymers of olefins with monomers copolymerizable therewith such as ethylene/propylene copolymer, ethyene/butene copolymer, ethylene/vinyl acetate copolymer, ethylene/vinyl chloride copolymer, propylene/butene copolymer and ethylene/ethyl acrylate copolymer, and mixtures of these olefinic polymers or copolymers; polyvinyl chloride-type elastomers such as copolymer of vinyl chloride and urethane or vinyl acetate and vinyl chloride polymers of a high degree of polymerization containing a plasticizer; (iii) polyurethane elastomers such as copolymers of lactone ester polyols and isocyanates, copolymers of adipic ester polyols and isocyanates, and copolymers of tetramethylene glycol and isocyanates; and (iv) polyester elastomers typified by a copolymer of butylene terephthalate and tetramethylene ether glycol.

There is no particular restriction on the filler, and known fillers generally used in the production of films having moisture permeability and water-proofness can be used. Examples of fillers that can be especially suitably used include calcium carbonate, calcium sulfate, calcium sulfite, various clays, cement, asbestos, calcium hydroxide, silica, talc, zeolite, mica, titanium oxide, barium sulfate metal powders. They may be used either singly or in combination. Powdery organic crosslinked polymers such as a powder of crosslinked styrene/divinylbenzene copolymer and a powder of guanamine resin may additionally be used as the filler. Suitably, the filler has an average particle diameter of generally 0.01 to 20 microns, preferably 0.1 to 10 microns.

The amount of the filler filled in the resin varies depending upon the properties required of the film, but from the standpoint of flexibility, its suitable amount is 40 to 80% by weight for inorganic fillers and 10 to 40% by weight for organic fillers, both based on the total amount of the thermoplastic resin and the filler.

As required, a stretching aid may be added at the time of mixing the thermoplastic resin and the filler. There is no particular restriction on the stretching aid. Generally, suitable stretching aids include, for example, polyester-type plasticizers, epoxy-type plasticizers, silicone oils, surface-active agents typified by decaglyceric acid esters, paraffins and waxes. It is sufficient to use the stretching aid in an amount of 0.1 to 10% by weight based on the total amount of the thermoplastic resin and the filler.

As required, pigments, antistatic agents, heat stabilizers, antioxidants, ultraviolet absorbers, etc. used in the production of general stretched films may be incorporated.

A tubular film F to be stretched is produced as above and is introduced into the stretching device without winding it up. Alternatively, the tubular film F as produced may be first wound up and then unwound and introduced into the stretching device. Prior to the introduction of the tubular film into the stretching device, it may be monoaxially stretched longitudinally by methods known per se. With reference mainly to FIGS. 1 and 2, the tubular film F to be stretched is introduced into the stretching device from above, passed over the guide block and nipped by the rolls 10 and 12 (the pair of payoff nip rolls). It passes over the mandrel 38, travels downwardly, and is then nipped by the rolls 20 and 22 (the pair of take-up rolls). While the tubular film F travels around and over the pre-heating section 40 of the mandrel 38, it is pre-heated by hot air discharged from the annular discharge nozzles 102. It is further heated by hot air discharged from the annular discharge nozzles 102 while travelling over the stretching section 42 of the mandrel 38. At the same time, the tubular film F is stretched circumferentially (transversely) by the action of the outer circumferential edges of the rings 58, 60 and 62 having a larger outside diameter than the diameter of the tubular film F.

The outer circumferential edges of the rings 58, 60 and 62 are defined by the outer corcumferential surfaces of the rotating members 76 (FIG. 3) or the rotating members 92 (FIG. 4) capable of free rotation as stated hereinabove, and as the tubular film F travels, the rotating members 76 or 92 rotate. Accordingly, the frictional resistance exerted on the tubular film F from the rings 58, 60 and 62 is very low, or substantially zero. Accordingly slit and nipture formation in the tubular film can be accurately circumvented even when the film F has a relatively low tensile strength, and the travelling speed (i.e., the stretching speed) of the film F is relatively high and the stretch ratio is high. In addition, since the outer circumferential edge defined by the outer circumferential surfaces of the rotating members 76 or 92 is generally smoothly circular, circumferential stretching of the tubular film F can be uniformly carried out entirely in the circumferential direction.

The circumferentially stretched tubular film F is cooled by the cooling medium discharged from the annular discharge nozzles 104 while travelling in the cooling zone 108. Then, the tubular film F is flattened in the left-right direction in FIG. 1 by the action of the lower end portion of the guide member 114. Thus, crease formation in the film F between the cooling zone 108 and the rollers 20 and 22 can be accurately prevented. The tubular film F conveyed further downwardly while being nipped by the rolls 20 and 22 may be wound up on a suitable wind-up roll (not shown).

As required, during travelling through the stretching device, the tubular film may additionally be stretched longitudinally (in the travelling direction). This may be achieved by setting the rotating speed of the rolls 20 and 22 (the pair of take-up nip rolls) at a value higher by a required amount than the rotating speed of the rolls 10 and 12 (the pair of payoff nip rolls).

The temperature of the tubular film F, i.e. the stretching temperature, during travelling over the stretching section 42 of the mandrel 38 is to be determined depending upon the material from which the tubular film F is made. Generally, it is preferably below the softening point or melting point of the tubular film F, particularly a temperature 10° to 60° C. lower than the softening or melting point. The preferred stretch ratio of the tubular film F in the circumferential direction (the transverse direction) is generally from 1.1 to 5, especially from 1.2 to 3. On the other hand, the preferred total stretch ratio of the tubular film in the longitudinal stretching to be carried out before introduction into the stretching device and/or in the stretching device is generally from 1.1 to 8, especially from 1.2 to 5.

The following examples illustrate the present invention more specifically.

EXAMPLE A

Twenty-eight parts by weight of linear low-density polyethylene (tradename "Ultzex 2021", ethylene/4-methylpentene-1 copolymer produced by Mitsui Petorochemical Industries; MFI=2.0), 22 parts by weight of linear low-density polyethylene (tradename "Sumikathene-L FA201-0", ethylene/butene-1 copolymer produced by Sumitomo Chemical Co., Ltd., MFI=2.0) 50% by weight of calcium carbonate surface treated with 1.0% by weight thereof of stearic acid (average particle diameter 1.0 micron, a product of Shiraishi Calciu Corp.) and 0.1% by weight of tetrakis (methylene-3(3', 5'-di-t-butyl-4-hydroxyphenyl)propionate)-methane (tradename "Irganox 1010", a product of Ciba Geigy) were mixed by a ribbon blender. The mixture was extruded by a twin-screw extruder having an effective inside diameter of 44 mm while keeping the mixture at a temperature of 200° to 210° C. to form pellets.

Then, the pellets were fed into an extruder having an effective inside diameter of 50 mm, and extruded through a rotating spiral circular die at a temperature of 205° to 210° C. to produce an air inflation tubular film having a diameter of 245 mm (with a width of 385 mm in the flattened state) and a thickness of 45 microns at a speed of 33 m/min. and wound up.

Then, the tubular film was stretched longitudinally to 1.5 times by an ordinary roll-type monoaxial stretching device in which hot rolls were kept at a surface temperature of 60° C. and cooling rolls at a surface temperature of 25° C. to obtain a monoaxially stretched tubular film having a diameter of 230 mm (with a width of 361 mm in the flattened state).

Then, the monoaxially stretched film was introduced into the stretching device described above with reference to FIGS. 1 to 3.

The particulars of the stretching device were as follows:
Delivery speed by the rolls (10 to 12):49.5 m/min.
Take-up speed by the rolls (20 and 22):49.0 m/min.
Atmospheric temperature of the pre-heating section (40) and the stretching section (42) of the mandrel (38):95° C.
Surface temperature of the tubular film travelling over the stretching section (42) of the mandrel (38):80° C.
Temperature of the cooling water in the cooling zone (108):18° C.
Amount of the cooling water in the cooling zone (108):10 liters/min.
The dimension of the pre-heating section (40) of the mandrel (38) was as follows:
Length in the film travelling direction:1,400 mm
Outside diameter of the cylindrical walls (44, 46, 48) excepting the introduction section (56):230 mm
The stretching section (40) of the mandrel (38) was constructed of three rings (58,60 and 62) of the following particulars.
Diameter of the outer circumferential edge of first ring (58): 320 mm
Diameter of the outer circumferential edge of second ring (60):350 mm
Diameter of the outer circumferential edge of third ring (62):425 mm
(Hence, the prescribed transverse stretch ratio was 1.85.)
Vertical distance between the first ring (58) and the second ring (60): 120 mm
Vertical distance between the second ring (60) and the third ring (62): 80 mm In each of the first to the third rings (58,60 and 62) eight supporting arms (68) are provided at equiangular intervals in the circumferential direction. The circumferential width of the projecting end surface of each of the supporting arms (68) was 5 mm. The number of bearings (72) mounted between the supporting arms (68) was as follows:
First ring (58):176
Second ring (60): 184
Three ring (62): 224

The bearings (72) were made of high temperature bearing steel and had the following size.
Outside diameter: 16 mm
Inside diameter: 5 mm
Width: 5 mm The tubular film stretched without slit formation and taken up on the rolls (20 and 22) was then passed between four rolls having a surface temperature of 60° C. to heat-set it, and then cooled to room temperature. Thereafter, both sides of the flattened tubular film were cut open to form two flat films. Each flat film had a width of 540 mm, and therefore, the transverse stretch ratio was 1.50 and the longitudinal stretch ratio was 1.48 in the stretching device (it is seen therefore that the tubular film was slightly shrunken in the above heat-setting). The flat film had a thickness of 35 microns ± 9%. The appearance of the film as wound up on a wind-up roll was good.

The properties of the flat film measured were as shown below.

TENSILE PROPERTIES

Strength at 5% stretch (g/25 mm width):
 450 (in the machine direction)
 290 (in the transverse direction)
Strength at break (g/25 mm width)
 1,500 (in the machine direction)
 900 (in the transverse direction)
Elongation at break (%):
 380 (in the machine direction
 430 (in the transverse direction)
Tear strength (g): (in the machine direction)
Moisture permeability (g/m$^2$.24 hrs): 4,800
Maximum pore diameter (microns): 0.7

The tensile properties were measured by means of a universal tensile tester ("Tensilon" made by Toyo Baldwin Company) at 25° C. and a tensile speed of 200 mm/min. using flat film samples having a width of 25 mm. The tear strength was measured in accordance with JIS L1085, Method A-1. The moisture permeability was measured at a temperature of 40° C. and a relative humidity of 90%. The maximum pore diameter was measured in accordance with ASTM F-316-70 using an ethanol-impregnated sample.

COMPARATIVE EXAMPLE 1

The same monoaxially stretched tubular film as used in Example A was stretched in the same stretching device as used in Example A except that the stretching section of the mandrel (38) was formed of a truncated conical iron wall having a vertical length of 400, an outside diameter at its upper end of 230 mm and an outside diameter at its lower end of 425 mm. When the delivery speed of the film by the rolls (10 and 12) was increased to more than 5 m/min., a longitudinal slit formed in the film in the stretching section of the mandrel (38) and transverse rupture formed in the immediately downstream of the mandrel (38).

COMPARATIVE EXAMPLE 2

The same stretching device as used in Example A was used except that the outer circumferential edges of the first to third rings constituting the stretching section of the mandrel (38) were defined by steel balls having a diameter of 20 mm and aligned circumferentially with the distance between the centers of two adjoining balls being adjusted to about 25 mm, and these steel balls were held so as to rotate in an arbitrary direction in the nearly hemispherical recess of a supporting member with nearly halves of the steel balls projected from the supporting members. The same monoaxially stretched tubular film was stretched, heat-set, cooled and cut open under the same conditions as in Example A to form two flat films, Each flat film has a thickness of 35 microns ±16%, and showed a relatively large thickness error. The film as wound up on a wind-up roll showed a wavy pattern in the widthwise direction and therefore a poor appearance.

What is claimed is:

1. A stretching device for stretching a tubular film, said device comprising a mandrel including a stretching section; a pair of payoff nip rolls disposed upstream of said mandrel and a pair of take-up nip rolls disposed downstream of said mandrel; said pair of payoff nip rolls adpated to deliver the tubular film to said mandrel and to cause the tubular film to travel in a direction around and over said mandrel, said mandrel adapted to stretch the tubular film transversely of the travel direction during travel; said pair of take-up nip rolls adapted to take up the tubular film; said stretching section of said mandrel comprising a plurality of rings concentrically spaced apart in the travel direction of the tubular film, the outside diameter of a ring on the downstream side being larger than the outside diameter of a ring on the upstream side; and a plurality of rotating members rotatably mounted on each of said stretching section rings; said plurality of rotating members together defining a generally smooth circular circumferential surface around the outer circumference of each of said rings, said smooth circumferential surface providing the tubular film with a smooth stretched surface.

2. The stretching device of claim 1 wherein each of said rotating members rotates about an axis extending within a plane substantially perpendicular to the travel direction of the tubular film.

3. The stretching device of claim 2 wherein each of the said rotating members has a convexly-shaped outer circumferential surface.

4. The stretching device of claim 2 wherein each of the rotating members has a cylindrically-shaped outer circumferential surface.

5. The stretching device of claim 1 wherein the mandrel further comprises a pre-heating section disposed upstream of the stretching section, and heating means for heating the tubular film in the preheating section and the stretching section of the mandrel.

6. The stretching device of claim 5 wherein the pre-heating section of the mandrel comprises a plurality of pre-heating section rings having substantially the same outside diameter as the diameter of the tubular film before stretching transversely of the travel direction and being substantially concentrically spaced apart in the travel direction of the film; and a plurality of pre-heating section rotating members rotatably mounted on each of said pre-heating section rings, said plurality of pre-heating section rotating members together defining a generally smooth circumferential surface around the outer circumference of each of said pre-heating section rings.

7. The stretching device of claim 6 wherein each of said pre-heating section rotating members rotates about an axis extending within a plane substantially parallel to the travel direction of the tubular film.

8. The stretching device of claim 7 wherein each of said pre-heating section rotating members has a convexly-shaped outer circumferential surface.

9. The stretching device of claim 8 wherein each of said pre-heating section rotating members has a cylindrically-shaped outer circumferential surface.

10. The stretching device of claim 5 wherein the pre-heating section of the mandrel comprises a cylidrical wall having substantially the same outside diameter as the diameter of the tubular film before stretching transversely of the travel direction.

11. The stretching device of claim 1 further comprising cooling means disposed to cool the tubular film in a cooling zone located downstream of the stretching section of the mandrel.

12. The stretching device of claim 11 further comprising a guide member having a width in the direction of the central axis of the pair of take-up nip rolls in at least its downstream portion corresponding to half of the circumferential length of the stretched tubular film disposed between the cooling zone and the pair of take-up rolls.

13. The stretching device of claim 1 wherein the tubular film is made of a thermoplastic resin containing 10 to b 85% by weight of an inorganic filler.

14. The stretching device of claim 13 wherein the tubular film is made of the thermoplastic resin containing 40 to 80% by weight of the inorganic filler.

* * * * *